(12) United States Patent
Kryvoshei (10) Patent No.: US 11,936,794 B2
(45) Date of Patent: Mar. 19, 2024

(54) METHOD AND SYSTEM FOR PARALLEL PROCESSING OF SMART CONTRACTS IN PERMISSIONED BLOCKCHAINS

(71) Applicant: MASTERCARD INTERNATIONAL INCORPORATED, Purchase, NY (US)

(72) Inventor: Dmytro Kryvoshei, Edison, NJ (US)

(73) Assignee: MASTERARD INTERNATIONAL INCORPORATED, Purchase, NY (US)

( * ) Notice: Subject to any disclaimer, the term of this patent is extended or adjusted under 35 U.S.C. 154(b) by 247 days.

(21) Appl. No.: 17/476,858

(22) Filed: Sep. 16, 2021

(65) Prior Publication Data

US 2023/0082470 A1    Mar. 16, 2023

(51) Int. Cl.
*H04L 29/06* (2006.01)
*H04L 9/32* (2006.01)
*H04L 9/00* (2022.01)

(52) U.S. Cl.
CPC .......... *H04L 9/3247* (2013.01); *H04L 9/3236* (2013.01); *H04L 9/3297* (2013.01); *H04L 9/50* (2022.05)

(58) Field of Classification Search
CPC ... H04L 9/3247; H04L 9/3236; H04L 9/3297; H04L 9/50
See application file for complete search history.

(56) References Cited

U.S. PATENT DOCUMENTS 10,673,617 B1 * 6/2020 Antoniou ............ G06F 13/4282
2019/0087793 A1   3/2019 Dickerson et al.
2020/0044824 A1 * 2/2020 Xie ....................... H04L 9/0637
2021/0150519 A1 * 5/2021 Wang ................. G06Q 20/3829
2021/0160245 A1 * 5/2021 Xia ....................... G06Q 20/389
2021/0194672 A1 * 6/2021 Narayanam ........... G06F 9/4418
2022/0100733 A1 * 3/2022 Tock ....................... G06F 21/64
2022/0292082 A1 * 9/2022 Qiu ..................... G06F 16/2379

(Continued)

OTHER PUBLICATIONS

International Search Report and the Written Opinion of the International Searching Authority, dated Nov. 30, 2022, Issued in corresponding International Application No. PCT/us2022/041305, 10 pps.

(Continued)

*Primary Examiner* — Ka Shan Choy
(74) *Attorney, Agent, or Firm* — Panitch Schwarze Belisario & Nadel LLP (57) ABSTRACT

A method for parallel execution of dispatches in a smart contract in a blockchain includes: receiving, by a blockchain node in a blockchain network, a smart contract; identifying dispatches as inputs for the smart contract; separating the dispatches into sets, where each set includes at least one dispatch where each dispatch includes a common reference value associated with an entry in a prior block in the blockchain; determining one valid dispatch in each set based on predetermined criteria; executing the smart contract using the one valid dispatch for each set; a new block for the blockchain including blockchain data entries generated by execution of the smart contract; and transmitting the generated new block to a plurality of additional nodes in the blockchain network.

22 Claims, 5 Drawing Sheets

(56) References Cited

U.S. PATENT DOCUMENTS

2022/0327526 A1* 10/2022 Paavolainen ........ G06Q 10/083

OTHER PUBLICATIONS

Pang, Shuaifeng, et al., "Concurrency Protocol Aiming at High Performance of Execution and Replay for Smart Contracts." arXiv preprint arXiv:1905.07169 (2019); Retrieved from the Internet :<URL: https://arxiv.org/pdf/1905.07169> May 17, 2019 (May 17, 2019), 13 pps.

* cited by examiner

METHOD AND SYSTEM FOR PARALLEL PROCESSING OF SMART CONTRACTS IN PERMISSIONED BLOCKCHAINS

FIELD

The present disclosure relates to the parallel execution of dispatches in a smart contract in a blockchain, specifically the identification of all dispatches related to a smart contract and the use of predetermined rules across nodes such that all dispatches can be executed in parallel with consistency across all nodes, thus maintaining accuracy and immutability.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

Another popular aspect of blockchains are smart contracts, which are self-executing contracts that are stored on the blockchain that automatically execute upon the fulfillment of criteria with a result that is predetermined based on the input(s), also referred to as dispatches, to the contract. Smart contracts can be versatile and used for a number of purposes, such as in an escrow capacity where an amount of currency or other asset is automatically transferred upon a criteria being fulfilled, such as the transfer of ownership of property or another asset. In some cases, smart contracts may be configured to execute dozens or hundreds of times, such as out of convenience or efficiency. In such cases, the contract is executed sequentially, where the contract is executed for each dispatch once at a time until all applicable dispatches have been executed.

In traditional blockchain systems, smart contracts have to execute sequentially in case there are instances where execution of the smart contract may violate a tenet of the blockchain. For instance, the smart contract may have multiple dispatches that, when the smart contract executes, attempt to transfer the same asset. In such a case, only one execution should complete successfully, as the second could not be validated for attempting to transfer an asset that had already been transferred. As a result, blockchains execute dispatches for a smart contract sequentially to prevent an instance where an asset may be spent or transferred twice. However, requiring sequential execution of a smart contract can take a significant amount of time, especially when there is a significant amount of inputs for a smart contract. In cases where a blockchain needs to have blocks added with frequency, such as on the order of milliseconds, sequential execution can be too slow for a blockchain.

Thus, there is a need for a technical system that can enable a blockchain node to execute all dispatches of a smart contract in parallel, to take advantage of powerful computing resources and perform desired functions without limitation and without delaying addition of new blocks in a blockchain, while still preventing unauthorized transactions and transfer of assets.

SUMMARY

The present disclosure provides a description of systems and methods for parallel execution of dispatches in a smart contract in a blockchain. When a blockchain node is to execute a smart contract, the blockchain node first identifies all dispatches for execution using the smart contract. Prior to beginning execution, the blockchain node identifies reference data for each of the dispatches, which may be a prior transaction on the blockchain whose assets would be transferred again as part of the execution of the smart contract for that dispatch. Every dispatch that has the same reference value is grouped together and a single dispatch from each group selected by the blockchain node using predetermined criteria, such as an ordering of a hash value included in each of the dispatches. The blockchain node executes the smart contract using the selected dispatch from every group and any solo dispatches in parallel, which enables the smart contract to be executed for every valid dispatch significantly faster than using sequential execution. Because only a single dispatch is selected for every dispatch that has a common reference value, there is no risk for that reference being used more than once, which is prohibited in the blockchain (e.g., such a transaction would fail validation). As a result, the smart contract can be executed in parallel to improve processing time without sacrificing the benefits of the blockchain or putting any of the blockchain data at risk.

A method for parallel execution of dispatches in a smart contract in a blockchain includes: receiving, by a receiver of a blockchain node in a blockchain network, a smart contract associated with a blockchain; identifying, by a processor of the blockchain node, a plurality of dispatches as inputs for the smart contract; separating, by the processor of the blockchain node, the plurality of dispatches into one or more sets of dispatches, where each set of dispatches includes at least one dispatch and where each dispatch in a set of dispatches includes a common reference value associated with an entry in a prior block in the blockchain; determining, by the processor of the blockchain node, one valid dispatch in each of the one or more sets of dispatches based on predetermined criteria; executing, by the processor of the blockchain node, the smart contract using the one valid dispatch for each of the one or more sets of dispatches; generating, by the processor of the blockchain node, a new block for the blockchain, wherein the new block includes one or more blockchain data entries, the one or more blockchain data entries including data generated by execution of the smart contract; and transmitting, by a transmitter of the blockchain node, the generated new block to a plurality of additional nodes in the blockchain network.

A system for parallel execution of dispatches in a smart contract in a blockchain includes: a blockchain network; a blockchain node included in the blockchain network; and a plurality of additional nodes in the blockchain network, wherein the blockchain node includes: a receiver receiving a smart contract associated with a blockchain; a processor identifying a plurality of dispatches as inputs for the smart contract, separating the plurality of dispatches into one or more sets of dispatches, where each set of dispatches includes at least one dispatch and where each dispatch in a set of dispatches includes a common reference value associated with an entry in a prior block in the blockchain, determining one valid dispatch in each of the one or more sets of dispatches based on predetermined criteria, executing, the smart contract using the one valid dispatch for each of the one or more sets of dispatches, and generating a new block for the blockchain, wherein the new block includes one or more blockchain data entries, the one or more blockchain data entries including data generated by execution of the smart contract; and a transmitter transmitting the generated new block to the plurality of additional nodes.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Parallel Execution of Smart Contracts

Figure 1:
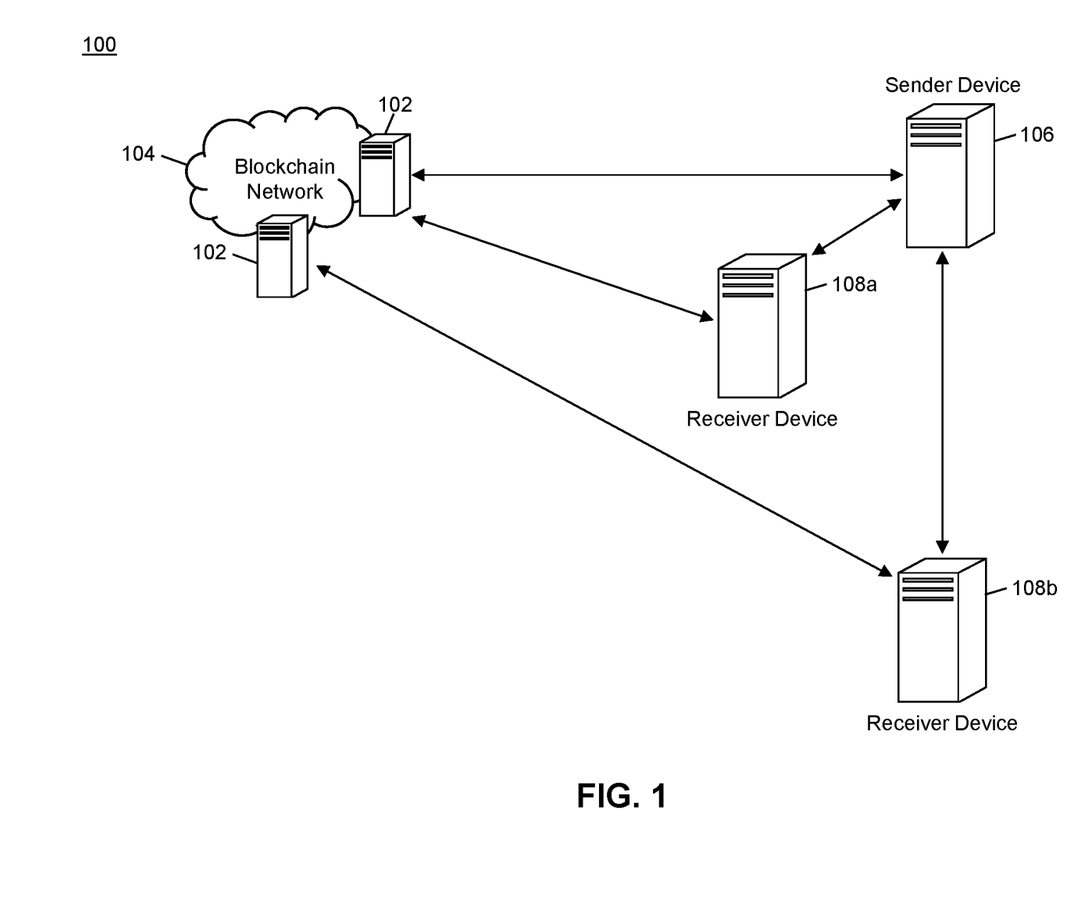
FIG. 1 is a block diagram illustrating a high level system architecture for parallel execution of dispatches in a smart contract in accordance with exemplary embodiments.

FIG. 1 illustrates a system 100 for the parallel execution of dispatches as inputs to a smart contract in a blockchain through the use of grouping and predetermined criteria.

Figure 2:
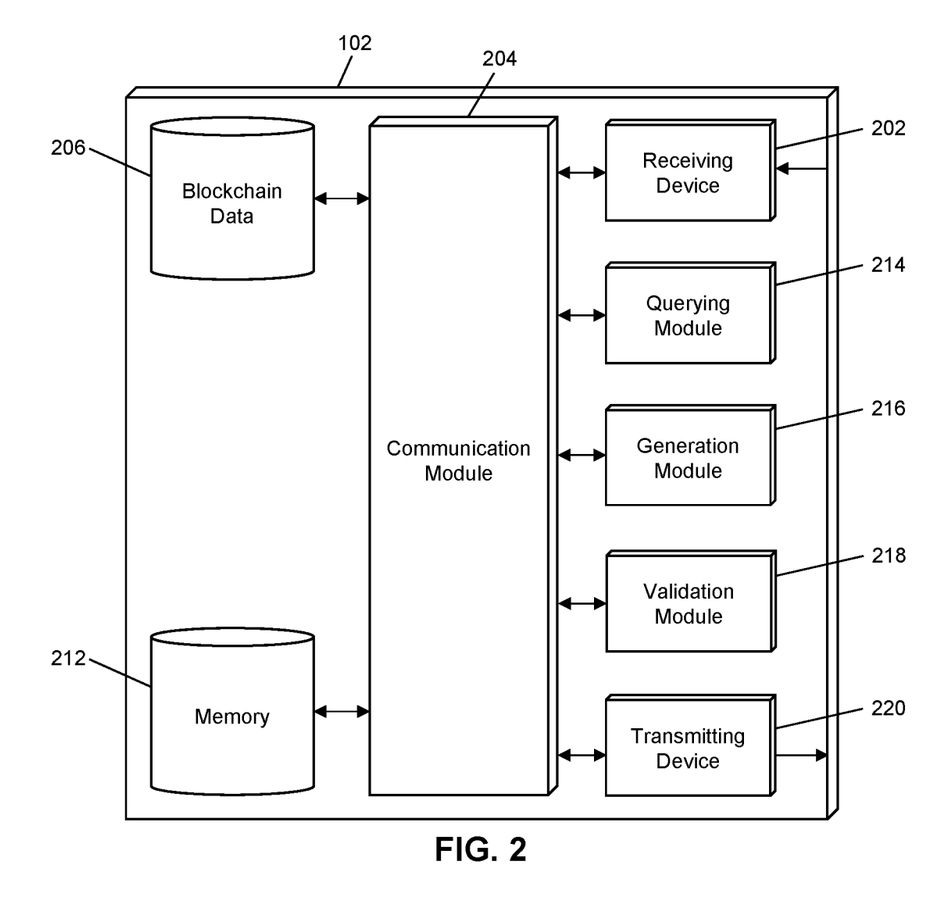
FIG. 2 is a block diagram illustrating a blockchain node of the system of FIG. 1 for parallel execution of dispatches in a smart contract in accordance with exemplary embodiments.
Figure 5:
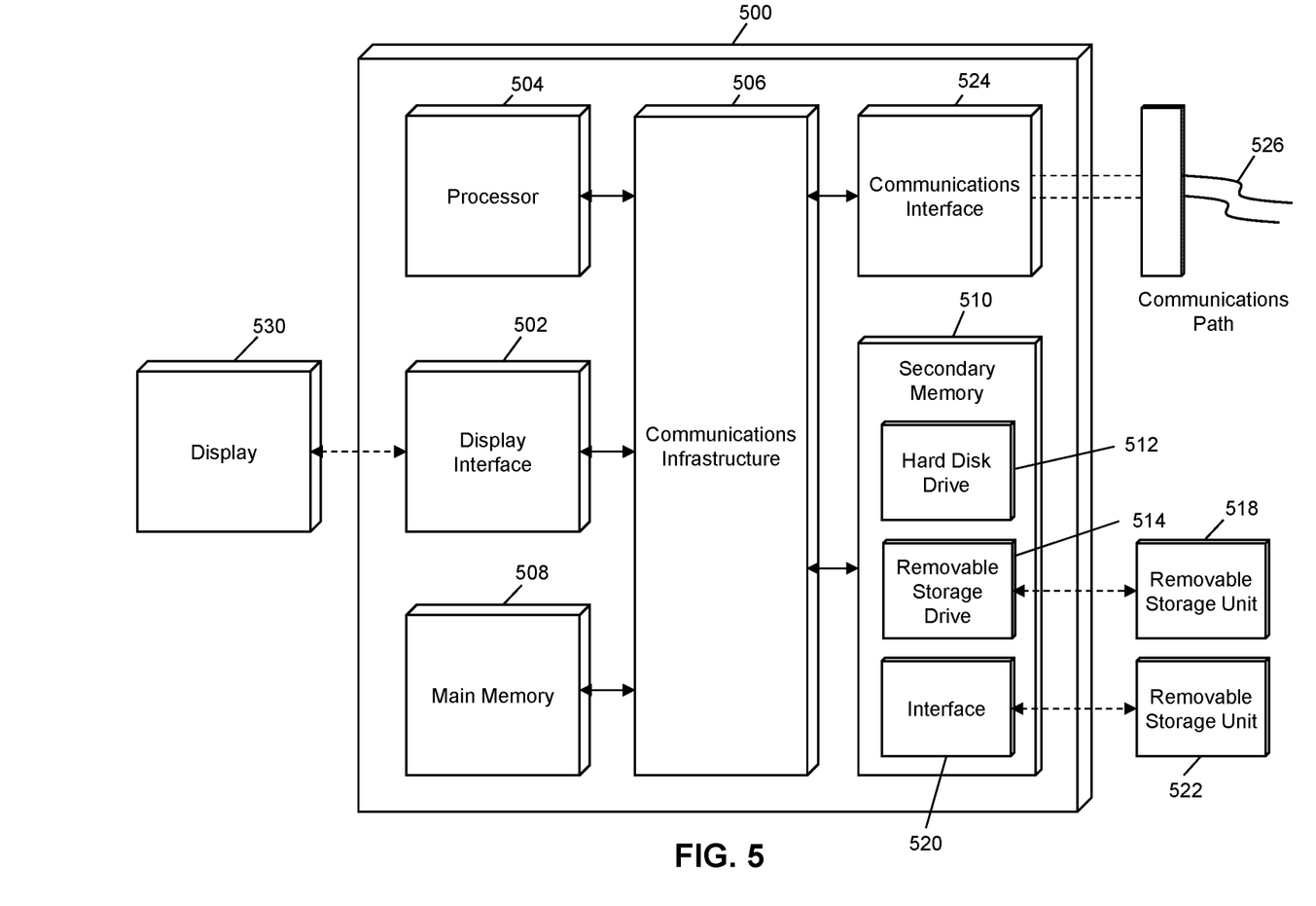
FIG. 5 is a block diagram illustrating a computer system architecture in accordance with exemplary embodiments.

The system 100 may include one or more blockchain nodes 102. Each blockchain node 102 may be part of a blockchain network 104. Each blockchain node 102 may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 102 in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 106 or receiver device 108a, 108b) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 106) that is generated using the sender's private key, a blockchain address of the recipient of currency (e.g., a receiver device 108a, 108b) generated using the recipient's public key, and a blockchain currency amount that is transferred or other data being stored. In the case of the blockchain being used for data storage separate from currency, the currency amount may be replaced by such other data. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

In some embodiments, the blockchain may be a permissioned blockchain. A permissioned blockchain may be a blockchain where only authorized participants may transact (e.g., send or receive assets or otherwise provide data) using the blockchain. In such cases, participants may be provided authorization by a blockchain node 102, such as being provided a cryptographic key pair or by providing its own public key to the blockchain node 102 for registration therein, where blockchain nodes 102 may ensure that any transactions submitted to the blockchain network 104 are from authorized devices (e.g., by validating the transactions using registered public keys). In such embodiments, the functions that may be performed by any participant in the blockchain may be limited and/or subject to authorization.

In the system 100, a smart contract may be stored in the blockchain associated with the blockchain network 104. A smart contract may be a contract that is self-executing, where a result of the smart contract after execution may be a new blockchain data value, such as a new blockchain transaction, that is to be stored in the blockchain. A smart contract may be executed using one or more inputs, also referred to as dispatches, which then generates a new blockchain data value. The smart contract may be self-executing such that the smart contract will automatically trigger execution when a valid dispatch is identified, or will automatically trigger when specific criteria is fulfilled, which may then result in specific dispatches being provided to the smart contract as inputs for execution. In an exemplary embodiment, each dispatch for the smart contract will refer to a prior blockchain data value on the blockchain, such as by using a hash value of the blockchain data value or a unique identification value stored in the blockchain with the blockchain data value. When a dispatch is fed as input to the smart contract, execution of the smart contract may result in a new blockchain data value, such as a blockchain transaction, which, in some instances, may depend on the dispatch itself, such as where a value in the dispatch may result in a different output from execution of the smart contract.

In an example, a smart contract may be used for escrow. In such an example, a buyer associated with a sender device 106 may be interested in purchasing an asset from a seller associated with a receiver device 108a for a decided-upon amount of currency. The buyer may transfer the amount of currency to an escrow blockchain wallet via a blockchain transaction. A smart contract may be stored as a part of the transaction or separate to the transaction, where the smart contract monitors the blockchain for evidence of the transfer of ownership of the asset from the seller to the buyer, such as by having a transfer contract or a hash thereof stored in the blockchain. Once the evidence is detected, the smart contract may execute, which may transfer the currency from the escrow blockchain wallet to a specified account for the seller. In such a case, the dispatch may be the evidence of the transfer of ownership, with the result upon execution being the transaction for the transfer of the currency from the escrow wallet to the seller's wallet.

In the system 100, a smart contract may be stored in the blockchain or otherwise provided to a blockchain node 102 that may have a plurality of different dispatches associated therewith. In a traditional system, a blockchain node 102 would execute the smart contract for each dispatch sequentially. In the system 100, the blockchain nodes 102 may be configured to execute all dispatches for the smart contract in parallel.

A blockchain node 102 may first identify all dispatches that are applicable for a smart contract, which may be identified using information included in the smart contract itself. For instance, the smart contract may explicitly list all of the dispatches or may include data to be used by the blockchain node 102 to identify the dispatches, such as by specifying one or more blockchain wallets, blockchain data values, transaction identifiers, etc. The blockchain node 102 may then group all of the dispatches into sets of dispatches. Each dispatch in a set of dispatches may have a common reference value, which may be the blockchain data value or other value stored in the blockchain to which the dispatch refers. In an example, a first dispatch may refer to a blockchain transaction for the transfer of 100 units of currency to the sender device 106, where execution of the smart contract would transfer those 100 units of currency from the sender device 106 to a receiver device 108*a*. In the example, a second dispatch may refer to the same blockchain transaction for the transfer of 100 units of currency to the sender device 106, where execution of the smart contract for that dispatch would transfer those 100 units of currency from the sender device 106 to a receiver device 108*b*. In such an example, both dispatches utilize the same reference value (e.g., the blockchain transaction for the transfer of 100 units of currency to the sender device 106). As such, both dispatches would be placed into the same set by the blockchain node 102.

Once the blockchain node 102 has organized all of the dispatches into sets of dispatches, where some dispatches may be the only dispatch in a set, the blockchain node 102 may then select a single dispatch for each of the sets. The blockchain node 102 may select a single dispatch for a set of dispatches using any suitable predetermined criteria. In one example, the blockchain node 102 may order all of the dispatches in the set and then select the first dispatch, or other predetermined dispatch in the ordering (e.g., middle, last, etc.). The blockchain node 102 may use any suitable data for ordering, such as a hash of the resulting transaction from execution of the smart contract, the time at which the dispatch was received or input into the smart contract, ordering in the smart contract itself of dispatches, a hash of the dispatch itself generated by the blockchain node 102, etc. In another example, the blockchain node 102 may use an algorithm for random or pseudo-random selection, where each blockchain node 102 in the blockchain network 104 utilizes the same algorithm with the same applicable inputs (e.g., seeds, weights, etc.) such that every blockchain node 102 would make the same selection. Any suitable criteria may be used such that the single dispatch selected for a set of dispatches by a blockchain node 102 is the same for every blockchain node 102 that performs the process.

Once the single dispatch has been selected for each set, the blockchain node 102 may execute the smart contract for every set of dispatches using the selected single dispatch for that set. In an exemplary embodiment, the blockchain node 102 may perform the executions of the smart contract in parallel, where the number of parallel executions may be based on processor cores of the blockchain node 102, available computing resources, or other suitable criteria. For example, the blockchain node 102 may have an eight core processor and may perform eight executions of the smart contract at a time, which may result in the smart contract being executed significantly faster (e.g., near eight times faster) than using sequential execution.

Execution of the smart contract for each set of dispatches may result in the generation of a new blockchain data value, or data to be included in a blockchain data value, for each set of dispatches. The blockchain node 102 may then use the blockchain data values in a new block that is generated by the blockchain node 102 using traditional methods and systems. The generated block may be transmitted to other blockchain node 102 in the blockchain network 104 for validation and confirmation using traditional methods. Once the new block has been confirmed, the block may be added to the blockchain by all of the blockchain nodes 102 in the blockchain network 104.

By organizing the dispatches into sets of dispatches and executing only a single dispatch from each set, no invalid blockchain transactions may be added to the blockchain as no reference value will have been used more than once. For instance, in the above example, only one of the transfers of the 100 units of currency by the sender device 106 will be selected because both transfers are in a single set of dispatches. As a result, only the receiver device 108*a* or the receiver device 108*b* (e.g., depending on the criteria that is used in the selection of the single dispatch in the set) will receive the 100 units of currency in the blockchain, which negates the possibility of double spend in the blockchain network 104. Thus, the methods and systems discussed herein provide for significantly improved processing speeds for execution of smart contracts without sacrificing any security or characteristics of a blockchain.

Blockchain Node

FIG. 2 illustrates an embodiment of a blockchain node 102, such as the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, sender devices 106, receiver devices 108*a*, 108*b*, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102, which may be superimposed or otherwise encoded with blockchain data values, data value identifiers, blocks, blockchain data, confirmation messages, smart contracts, predetermined criteria, dispatches, etc. The receiving device 202 may be configured to receive data signals electronically transmitted by sender devices 106 and/or receiver devices 108*a*, 108*b* that may be superimposed or otherwise encoded with blockchain data values, public keys, digital signatures, blockchain transaction data, smart contracts, dispatches for smart contracts, requests for authorization for the blockchain network 104, etc.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software executed on hardware or hardware particularly programmed to receive an input, perform one or more processes using the input, and provides an output. The input, output, and processes performed by various modules will be apparent to one skilled in the art based upon the present disclosure.

The blockchain node 102 may also include blockchain data 206, which may be stored in a memory 212 of the blockchain node 102 or stored in a separate area within the blockchain node 102 or accessible thereby. The blockchain data 206 may include a blockchain, which may be comprised of a plurality of blocks and be associated with the blockchain network 104. The blockchain data 206 may also or alternatively include any data associated with one or more blockchain wallets that may be used by the blockchain node 102, such as cryptographic key pairs, unspent transaction outputs, digital asset amounts, network identifiers for the blockchain network 104, smart contracts, signature generation algorithms, encryption algorithms, transaction account data, account balances, communication information for third party services, predetermined criteria, registered participant devices, device registration data, etc.

The blockchain node 102 may also include a memory 212. The memory 212 may be configured to store data for use by the blockchain node 102 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information for other computing systems, generation algorithms, predetermined criteria, ordering rules, etc.

The blockchain node 102 may include a querying module 214. The querying module 214 may be configured to execute queries on databases to identify information. The querying module 214 may receive one or more data values or query strings, and may execute a query string based thereon on an indicated database, such as the memory 212 of the blockchain node 102 to identify information stored therein. The querying module 214 may then output the identified information to an appropriate engine or module of the blockchain node 102 as necessary. The querying module 214 may, for example, execute a query on the blockchain data 206 to identify all possible dispatches for a smart contract that has been triggered for execution.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate cryptographic key pairs, generate digital signatures, generate blockchain data values, generate new blocks, execute smart contracts using selected dispatches, etc. The generation module 216 may also be configured to select (e.g., generate) a single dispatch from a set of dispatches using predetermined criteria, which may include ordering each dispatch in a set of dispatches based on applicable rules and selecting a single dispatch from the ordered set as indicated in the predetermined criteria.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to validate digital signatures using suitable signature generation algorithms and keys, validate blockchain transactions, validate smart contracts, validate the eligibility of participant devices, etc.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, sender devices 106, receiver devices 108a, 108b, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to other blockchain nodes 102, which may be superimposed or otherwise encoded blockchain data values, data value identifiers, blocks, blockchain data, confirmation messages, smart contracts, predetermined criteria, dispatches, etc. The transmitting device 220 may also be configured to electronically transmit data signals to sender devices 106 and/or receiver devices 108*a*, 108*b* that may be superimposed or otherwise encoded with requests for smart contracts or dispatches, authorization data for participation in the blockchain network 104, blockchain data 206, etc.

Process for Parallel Execution of a Smart Contract

Figure 3:
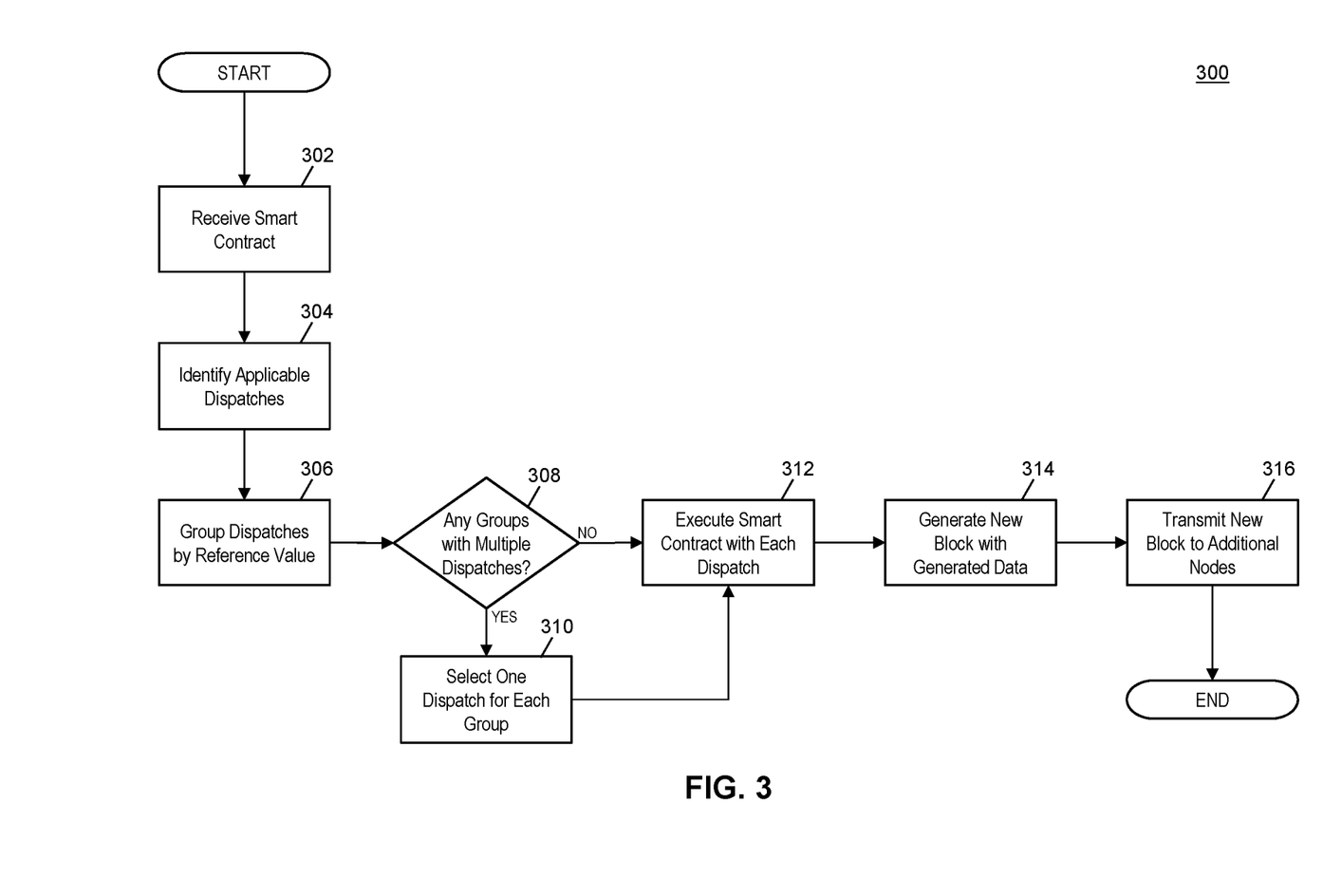
FIG. 3 is a flow diagram illustrating a process for parallel execution of dispatches in a smart contract using the blockchain node of FIG. 2 and the system of FIG. 1 in accordance with exemplary embodiments.

FIG. 3 illustrates a process 300 for the parallel execution of dispatches in a smart contract as executed by a blockchain node 102 in the system 100 of FIG. 1.

In step 302, a receiving device 202 of the blockchain node 102 may receive a smart contract for execution. In some cases, the smart contract may be submitted by a participant device, such as the sender device 106 or a receiver device 108*a*, 108*b*. In other cases, the smart contract may be stored in an existing block in the blockchain associated with the blockchain network 104 to which the blockchain node 102 belongs, where the smart contract may be triggered for execution, such as based on criteria set forth in the contract itself (e.g., as a result of the detection of a dispatch or an expiration time). In step 304, the querying module 214 of the blockchain node 102 may execute a query on the blockchain data 206 to identify all dispatches that are applicable to the smart contract, such as by identifying the dispatches in the smart contract itself stored in the blockchain or identifying the dispatches based on criteria in the smart contract.

In step 306, the generation module 216 of the blockchain node 102 may generate a plurality of different sets of dispatches for all of the dispatches identified by the blockchain node in step 304. Each dispatch in a set of dispatches may include a common reference value, which may be a hash value of a prior blockchain data value stored in the blockchain, such as was used for the transfer of assets to the sender device 106 in the above example. In instances where only a dispatch has a reference value that is not shared by any other dispatches, that dispatch may be the sole dispatch in a set of dispatches.

In step 308, the blockchain node 102 may determine if there are any sets of dispatches that have multiple dispatches in the set. If there is at least one set of dispatches that includes multiple dispatches, then, in step 310, the generation module 216 of the blockchain node 102 may select a single dispatch for each such set using predetermined criteria. In one example, the selection of a single dispatch may include ordering all of the dispatches in the set and then selecting the single dispatch from the ordered set according to the predetermined criteria. Once the single dispatches have been identified for each set of dispatches, or if there were no sets of dispatches with more than one dispatch included, then, in step 312, the generation module 216 of the blockchain node 102 may execute the smart contract for each set of dispatches using the single identified dispatch, or sole dispatch, for each set, where execution of the smart contract for each set of dispatches may generate a new blockchain data value for each set. In an exemplary embodiment, the executions of the smart contract performed in step 312 by the blockchain node 102 may be performed in parallel.

In step 314, the generation module 216 of the blockchain node 102 may generate a new block using the blockchain data values generated as a result of the executions of the smart contract. The new block may include a block header, which may include a timestamp and a reference to a prior block in the blockchain as well as a reference to all blockchain data values being included in the new block, and the generated blockchain data values. In some cases, additional blockchain data values may also be included in the new block, such as for other transactions, additions of data, smart contracts, etc., as may be received by the blockchain node 102 (e.g., using the receiving device 202) in standard processes. In step 316, the transmitting device 220 of the blockchain node 102 may electronically transmit the new block to a plurality of other blockchain nodes 102 in the blockchain network 104 for confirmation. The other blockchain nodes 102 may validate and confirm the new block using traditional methods and systems, where, if confirmed, the new block may then be added to the blockchain in all blockchain nodes 102 in the blockchain network 104.

Exemplary Method for Parallel Execution of Smart Contracts

Figure 4:
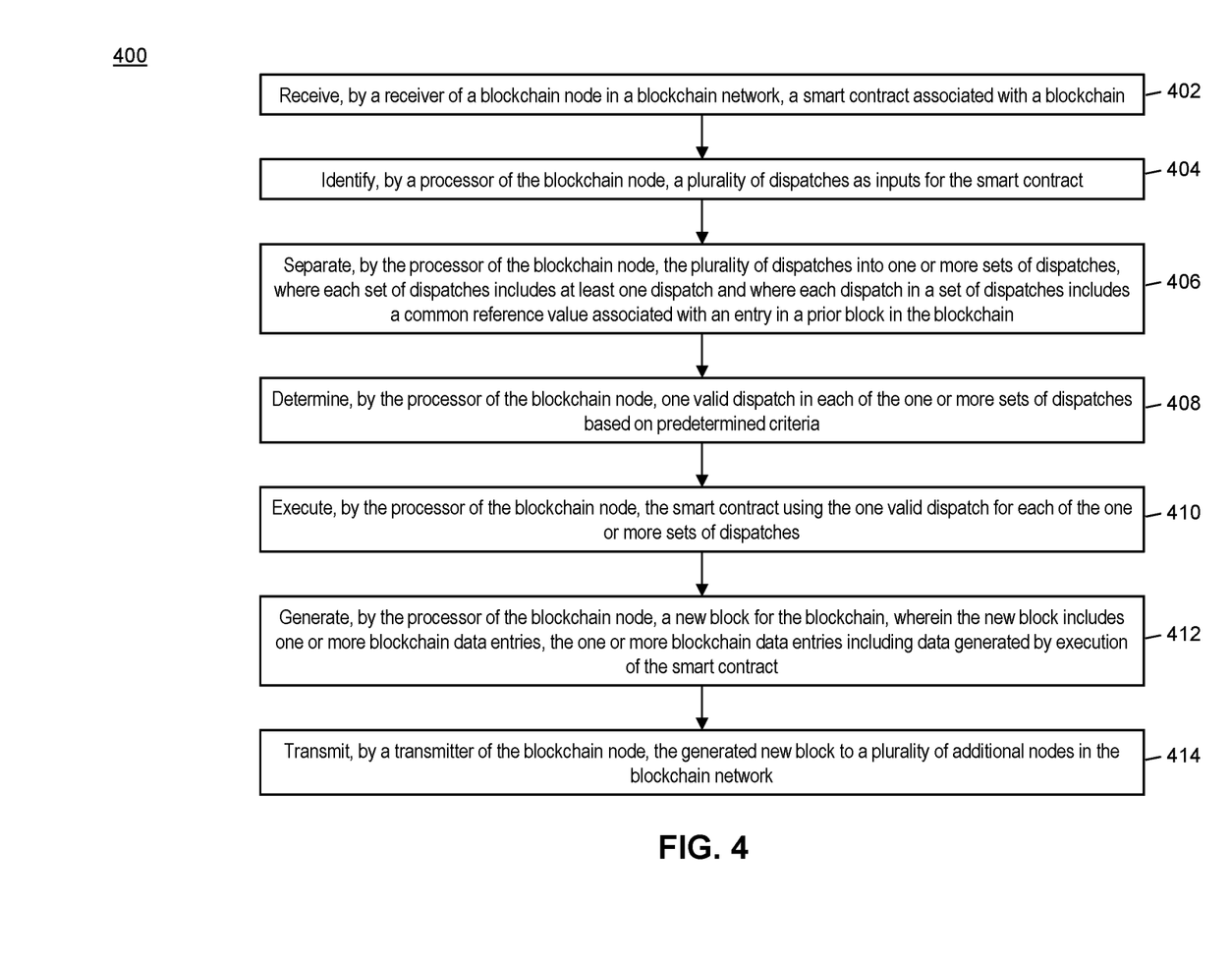
FIG. 4 is a flow chart illustrating an exemplary method for parallel execution of dispatches in a smart contract in accordance with exemplary embodiments.

FIG. 4 illustrates a method 400 for parallel execution of a plurality of dispatches in a smart contract in a blockchain using predetermined criteria.

In step 402, a smart contract associated with a blockchain may be received by a receiver (e.g., receiving device 202) of a blockchain node (e.g., blockchain node 102) in a blockchain network (e.g., blockchain network 104). In step 404, a plurality of dispatches may be identified by a processor (e.g., via a querying module 214) of the blockchain node as inputs for the smart contract. In step 406, the plurality of dispatches may be separated by the processor (e.g., via a generation module 216) of the blockchain node into one or more sets of dispatches, where each set of dispatches includes at least one dispatch and where each dispatch in a set of dispatches includes a common reference value associated with an entry in a prior block in the blockchain.

In step 408, one valid dispatch may be determined by the processor (e.g., via the generation module 216) of the blockchain node in each of the one or more sets of dispatches based on predetermined criteria. In step 410, the smart contract may be executed by the processor (e.g., via the generation module 216) of the blockchain node using the one valid dispatch for each of the one or more sets of dispatches. In step 412, a new block may be generated by the processor (e.g., via the generation module 216) for the blockchain, wherein the new block includes one or more blockchain data entries, the one or more blockchain data entries including data generated by execution of the smart contract. In step 414, the generated new block may be transmitted by a transmitter (e.g., transmitting device 220) of the blockchain node to a plurality of additional nodes in the blockchain network.

In one embodiment, the predetermined criteria may include ordering each dispatch in a set of dispatches, and the one valid dispatch for a set of dispatches may be a first dispatch after ordering the set of dispatches. In a further embodiment, each dispatch in the set of dispatches may be ordered based on a hash value included in the respective dispatch. In some embodiments, the smart contract may be executed using the one valid dispatch for each of the one or more sets of dispatches in parallel. In one embodiment, the blockchain may be a permissioned blockchain.

In some embodiments, the common reference value may be an identifier of a blockchain transaction in the blockchain. In one embodiment, executing the smart contract using the one valid dispatch may generate a new blockchain transaction transferring an asset, and the data generated by execution of the smart contract may include the new blockchain transaction for each of the one or more sets of dispatches. In a further embodiment, the asset transferred in a new blockchain transaction for one valid dispatch may be identified in the common reference value included in the set of dispatches including the one valid dispatch.

Computer System Architecture

FIG. 5 illustrates a computer system 500 in which embodiments of the present disclosure, or portions thereof, may be implemented as computer-readable code. For example, the blockchain node 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software executed on hardware, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software executed on hardware, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for parallel execution of dispatches in a smart contract in a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for parallel execution of dispatches in a smart contract in a blockchain, comprising:
    receiving, by a receiver of a blockchain node in a blockchain network, a smart contract associated with a blockchain;
    identifying, by a processor of the blockchain node, a plurality of dispatches as inputs for the smart contract;
    separating, by the processor of the blockchain node, the plurality of dispatches into one or more sets of dispatches, where each set of dispatches includes at least one dispatch and where each dispatch in a set of dispatches includes a common reference value associated with an entry in a prior block in the blockchain;
    determining, by the processor of the blockchain node, one valid dispatch in each of the one or more sets of dispatches based on predetermined criteria;
    executing, by the processor of the blockchain node, the smart contract using the one valid dispatch for each of the one or more sets of dispatches, the one valid dispatch for each of the one or more sets of dispatches being executed in parallel;
    generating, by the processor of the blockchain node, a new block for the blockchain, wherein the new block includes one or more blockchain data entries, the one or more blockchain data entries including data generated by execution of the smart contract; and
    transmitting, by a transmitter of the blockchain node, the generated new block to a plurality of additional nodes in the blockchain network.

2. The method of claim 1, wherein the predetermined criteria includes ordering each dispatch in a set of dispatches, and
    the one valid dispatch for a set of dispatches is a first dispatch after ordering the set of dispatches.

3. The method of claim 2, wherein each dispatch in the set of dispatches is ordered based on a hash value included in the respective dispatch.

4. The method of claim 1, wherein the blockchain is a permissioned blockchain.

5. The method of claim 1, wherein the common reference value is an identifier of a blockchain transaction in the blockchain.

6. The method of claim 1, wherein
    executing the smart contract using the one valid dispatch generates a new blockchain transaction transferring an asset, and
    the data generated by execution of the smart contract includes the new blockchain transaction for each of the one or more sets of dispatches.

7. The method of claim 6, wherein the asset transferred in a new blockchain transaction for one valid dispatch is identified in the common reference value included in the set of dispatches including the one valid dispatch.

8. A system for parallel execution of dispatches in a smart contract in a blockchain, comprising:
    a blockchain network;
    a blockchain node included in the blockchain network; and
    a plurality of additional nodes in the blockchain network, wherein
    the blockchain node includes:
        a receiver receiving a smart contract associated with a blockchain; and
        a processor configured for:
            identifying a plurality of dispatches as inputs for the smart contract,
            separating the plurality of dispatches into one or more sets of dispatches, where each set of dispatches includes at least one dispatch and where each dispatch in a set of dispatches includes a common reference value associated with an entry in a prior block in the blockchain,
            determining one valid dispatch in each of the one or more sets of dispatches based on predetermined criteria,
            executing, the smart contract using the one valid dispatch for each of the one or more sets of dispatches, the one valid dispatch for each of the one or more sets of dispatches being executed in parallel, and generating a new block for the blockchain, wherein the new block includes one or more blockchain data entries, the one or more blockchain data entries including data generated by execution of the smart contract, and
a transmitter transmitting the generated new block to the plurality of additional nodes.

9. The system of claim 8, wherein
the predetermined criteria includes ordering each dispatch in a set of dispatches, and
the one valid dispatch for a set of dispatches is a first dispatch after ordering the set of dispatches.

10. The system of claim 9, wherein each dispatch in the set of dispatches is ordered based on a hash value included in the respective dispatch.

11. The system of claim 8, wherein the blockchain is a permissioned blockchain.

12. The system of claim 8, wherein the common reference value is an identifier of a blockchain transaction in the blockchain.

13. The system of claim 8, wherein
executing the smart contract using the one valid dispatch generates a new blockchain transaction transferring an asset, and
the data generated by execution of the smart contract includes the new blockchain transaction for each of the one or more sets of dispatches.

14. The system of claim 13, wherein the asset transferred in a new blockchain transaction for one valid dispatch is identified in the common reference value included in the set of dispatches including the one valid dispatch.

15. A method for parallel execution of dispatches in a smart contract in a blockchain, comprising:
receiving, by a receiver of a blockchain node in a blockchain network, a smart contract associated with a blockchain;
identifying, by a processor of the blockchain node, a plurality of dispatches as inputs for the smart contract;
separating, by the processor of the blockchain node, the plurality of dispatches into one or more sets of dispatches, where each set of dispatches includes at least one dispatch and where each dispatch in a set of dispatches includes a common reference value associated with an entry in a prior block in the blockchain;
determining, by the processor of the blockchain node, one valid dispatch in each of the one or more sets of dispatches based on predetermined criteria;
executing, by the processor of the blockchain node, the smart contract using the one valid dispatch for each of the one or more sets of dispatches;
generating, by the processor of the blockchain node, a new block for the blockchain, wherein the new block includes one or more blockchain data entries, the one or more blockchain data entries including data generated by execution of the smart contract; and
transmitting, by a transmitter of the blockchain node, the generated new block to a plurality of additional nodes in the blockchain network,
wherein
the predetermined criteria includes ordering each dispatch in a set of dispatches, and
the one valid dispatch for a set of dispatches is a first dispatch after ordering the set of dispatches.

16. The method of claim 15, wherein each dispatch in the set of dispatches is ordered based on a hash value included in the respective dispatch.

17. A method for parallel execution of dispatches in a smart contract in a blockchain, comprising:
receiving, by a receiver of a blockchain node in a blockchain network, a smart contract associated with a blockchain;
identifying, by a processor of the blockchain node, a plurality of dispatches as inputs for the smart contract;
separating, by the processor of the blockchain node, the plurality of dispatches into one or more sets of dispatches, where each set of dispatches includes at least one dispatch and where each dispatch in a set of dispatches includes a common reference value associated with an entry in a prior block in the blockchain;
determining, by the processor of the blockchain node, one valid dispatch in each of the one or more sets of dispatches based on predetermined criteria;
executing, by the processor of the blockchain node, the smart contract using the one valid dispatch for each of the one or more sets of dispatches;
generating, by the processor of the blockchain node, a new block for the blockchain, wherein the new block includes one or more blockchain data entries, the one or more blockchain data entries including data generated by execution of the smart contract; and
transmitting, by a transmitter of the blockchain node, the generated new block to a plurality of additional nodes in the blockchain network,
wherein
executing the smart contract using the one valid dispatch generates a new blockchain transaction transferring an asset, and
the data generated by execution of the smart contract includes the new blockchain transaction for each of the one or more sets of dispatches.

18. The method of claim 17, wherein the asset transferred in a new blockchain transaction for one valid dispatch is identified in the common reference value included in the set of dispatches including the one valid dispatch.

19. A system for parallel execution of dispatches in a smart contract in a blockchain, comprising:
a blockchain network;
a blockchain node included in the blockchain network; and
a plurality of additional nodes in the blockchain network, wherein
the blockchain node includes:
a receiver receiving a smart contract associated with a blockchain; and
a processor configured for:
identifying a plurality of dispatches as inputs for the smart contract,
separating the plurality of dispatches into one or more sets of dispatches, where each set of dispatches includes at least one dispatch and where each dispatch in a set of dispatches includes a common reference value associated with an entry in a prior block in the blockchain,
determining one valid dispatch in each of the one or more sets of dispatches based on predetermined criteria,
executing, the smart contract using the one valid dispatch for each of the one or more sets of dispatches, and
generating a new block for the blockchain, wherein the new block includes one or more blockchain data entries, the one or more blockchain data entries including data generated by execution of the smart contract, and a transmitter transmitting the generated new block to the plurality of additional node, wherein the predetermined criteria includes ordering each dispatch in a set of dispatches, and the one valid dispatch for a set of dispatches is a first dispatch after ordering the set of dispatches.

20. The system of claim 19, wherein each dispatch in the set of dispatches is ordered based on a hash value included in the respective dispatch.

21. A system for parallel execution of dispatches in a smart contract in a blockchain, comprising:

a blockchain network;

a blockchain node included in the blockchain network; and a plurality of additional nodes in the blockchain network, wherein the blockchain node includes:

a receiver receiving a smart contract associated with a blockchain; and a processor configured for:

identifying a plurality of dispatches as inputs for the smart contract, separating the plurality of dispatches into one or more sets of dispatches, where each set of dispatches includes at least one dispatch and where each dispatch in a set of dispatches includes a common reference value associated with an entry in a prior block in the blockchain, determining one valid dispatch in each of the one or more sets of dispatches based on predetermined criteria, executing, the smart contract using the one valid dispatch for each of the one or more sets of dispatches, and generating a new block for the blockchain, wherein the new block includes one or more blockchain data entries, the one or more blockchain data entries including data generated by execution of the smart contract, and a transmitter transmitting the generated new block to the plurality of additional nodes, wherein executing the smart contract using the one valid dispatch generates a new blockchain transaction transferring an asset, and the data generated by execution of the smart contract includes the new blockchain transaction for each of the one or more sets of dispatches.

22. The system of claim 21, wherein the asset transferred in a new blockchain transaction for one valid dispatch is identified in the common reference value included in the set of dispatches including the one valid dispatch.

* * * * *